(12) United States Patent
Petrucha et al.

(10) Patent No.: US 12,119,521 B2
(45) Date of Patent: Oct. 15, 2024

(54) DIELECTRIC CONDUIT ASSEMBLIES AND METHODS OF MAKING THEREOF

(71) Applicant: BLOOM ENERGY CORPORATION, San Jose, CA (US)

(72) Inventors: Michael Petrucha, Santa Clara, CA (US); James Huynh, Fremont, CA (US); Avinash Verma, Cupertino, CA (US); Martin Perry, Mountain View, CA (US); Kyle Kekelis, Oakland, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1401 days.

(21) Appl. No.: 16/653,145

(22) Filed: Oct. 15, 2019

(65) Prior Publication Data

US 2020/0127308 A1    Apr. 23, 2020

Related U.S. Application Data

(60) Provisional application No. 62/746,820, filed on Oct. 17, 2018.

(51) Int. Cl.
| | |
|---|---|
| *H01M 8/2483* | (2016.01) |
| *B23K 1/00* | (2006.01) |
| *F16L 9/06* | (2006.01) |
| *F16L 9/14* | (2006.01) |
| *F16L 13/08* | (2006.01) |

(Continued)

(52) U.S. Cl.
CPC ....... *H01M 8/04216* (2013.01); *B23K 1/0016* (2013.01); *F16L 9/06* (2013.01); *F16L 9/14* (2013.01); *F16L 13/08* (2013.01); *H01M 8/2483* (2016.02); *B23K 2101/36* (2018.08); *B23K 2103/04* (2018.08); *B23K 2103/52* (2018.08); *H01M 2008/1293* (2013.01)

(58) Field of Classification Search
CPC ... F16L 13/08; F16L 9/06; F16L 11/15; F16L 25/0036; F16L 25/0063; F16L 13/0245; F16L 27/1012; F16L 27/1017; F16L 27/1021; F16L 23/026
See application file for complete search history.

(56) References Cited

U.S. PATENT DOCUMENTS 3,650,550 A  *  3/1972  West
4,523,738 A  *  6/1985  Raftis
(Continued)

FOREIGN PATENT DOCUMENTS

JP        2000162554 A  *  6/2000
WO    WO-2018016825 A1  *  1/2018

OTHER PUBLICATIONS

JP-2000162554-A—Machine Translation—English (Year: 2000).*
WO-2018016825-A1—Machine Translation—English (Year: 2018).*

*Primary Examiner* — William S. Choi
(74) *Attorney, Agent, or Firm* — THE MARBURY LAW GROUP PLLC (57) ABSTRACT

A conduit assembly includes a dielectric tube having a first end and a second end, a first metal tube including a first flange coupled to the first end of the inner dielectric tube, the first flange including relief openings, a first dielectric ring coupled to the first flange, a second metal tube including a second flange coupled to the second end of the inner dielectric tube, the second flange including relief openings, and a second dielectric ring coupled to the second flange.

20 Claims, 9 Drawing Sheets

(51) Int. Cl.
    *H01M 8/04082*    (2016.01)
    *B23K 101/36*     (2006.01)
    *B23K 103/00*     (2006.01)
    *B23K 103/04*     (2006.01)
    *H01M 8/12*      (2016.01)

(56) References Cited

U.S. PATENT DOCUMENTS

| | | |
|---|---|---|
| 6,598,241 B1 * | 7/2003 | Williams |
| 8,921,001 B2 | 12/2014 | Huynh et al. |
| 8,968,958 B2 | 3/2015 | Gottmann et al. |
| 10,050,298 B2 | 8/2018 | Huynh et al. |
| 2015/0204059 A1 * | 7/2015 | Whitehead |
| 2016/0102793 A1 * | 4/2016 | Shimizu |

* cited by examiner

DIELECTRIC CONDUIT ASSEMBLIES AND METHODS OF MAKING THEREOF

FIELD

Various embodiments relate to hermetic high temperature, dielectric fuel conduit assemblies, and in particular, dielectric fuel conduit assemblies for a fuel cell stack.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is directed to the cathode side of the fuel cell while a fuel flow is directed to the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° ° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air are distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate conduits between the stack and the manifold housing in which the stack is located.

Fuel cell stacks are frequently built from a multiplicity of cells in the form of planar elements, tubes, or other geometries. Fuel and air are provided to the electrochemically active surfaces, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

The various embodiments of the present disclosure provide a conduit assembly including a dielectric tube having a first end and a second end, a first metal tube including a first flange coupled to the first end of the inner dielectric tube, the first flange including relief openings, a first dielectric ring coupled to the first flange, a second metal tube including a second flange coupled to the second end of the inner dielectric tube, the second flange including relief openings, and a second dielectric ring coupled to the second flange.

Various embodiments provide a method of making a fuel cell system conduit assembly, comprising: brazing a first end of a dielectric tube to a first surface of a first flange of a first metal tube; brazing a first dielectric ring to a second surface of the first flange; brazing a second end of the dielectric tube to a first surface of a second flange of a second metal tube; and brazing a second dielectric ring to a second surface of the second flange. The brazing comprises forming ceramic-to-ceramic bonding points between the dielectric tube and the respective first and second dielectric rings through relief slots formed in the respective first and second flanges.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide hermetic dielectric conduit assemblies which may be incorporated into a fuel cell system, such as into the fuel conduits of fuel cell stacks externally manifolded for air and internally manifolded for fuel. The embodiment dielectric conduit assemblies may withstand the high temperatures and thermal cycling that occurs in the hot area of the fuel cell system or inside a fuel cell system's insulated hot box (e.g., with temperatures up to 1000° C., 1250° C., or higher) without leaking or otherwise failing. For example, in some embodiments, the dielectric conduit assembly may be part of a hermetically sealed gas delivery line in a fuel cell system and may include components that compensate for changes in stress due to thermal expansion.

Various embodiment conduit assemblies may compensate for differences in coefficients of thermal expansion of various components and the uneven expansion and associated stress that may result at high temperatures in the fuel cell system. Further, embodiment conduit assemblies may withstand the cycling of expansion and contraction resulting from heating and cooling of the fuel cell system, such as cycling between temperatures from 24° C. to 1000° C.

In various embodiments, the embodiment dielectric conduit assemblies may also act to electrically isolate portions of the fuel conduits or the fuel cell stack. For example, the dielectric conduit assembly may allow the use of metallic fuel manifold plates in the stack by electrically isolating the fuel cell stack or column from the balance of the fuel delivery plumbing. The metallic manifold plates beneficially provide continuous electrical conductivity within a stack or column, thereby reducing the possibility for degradation of resistance connections, as will be described below.

Figure 1:
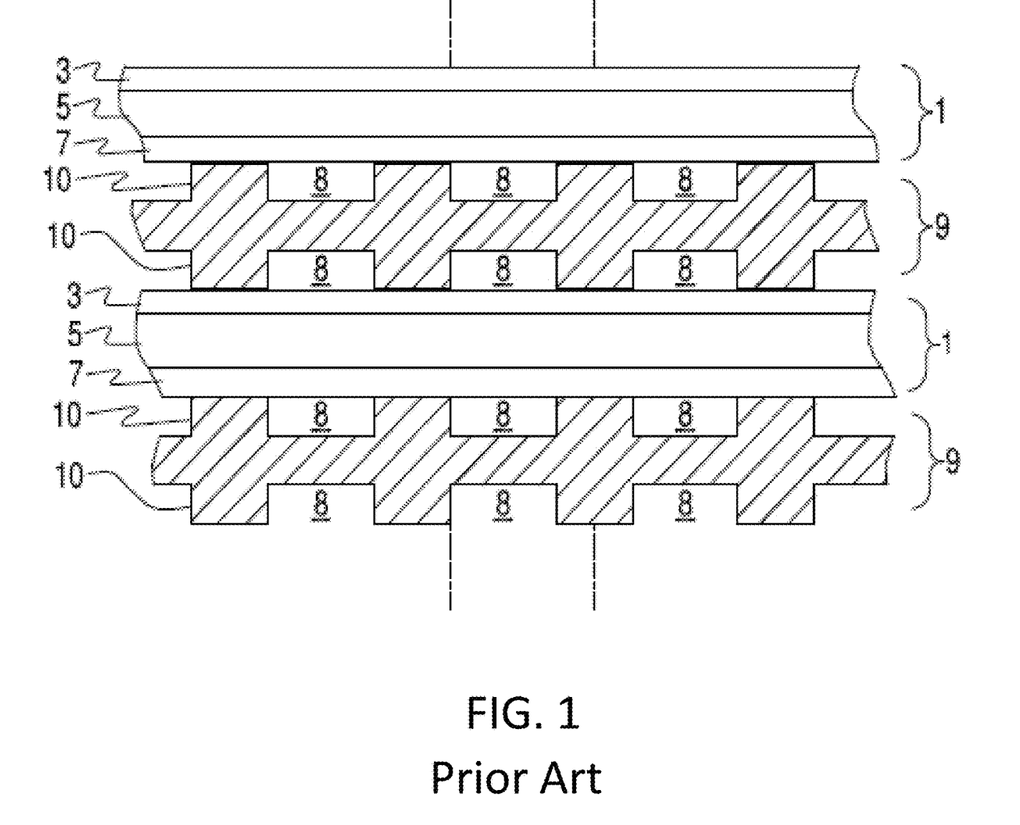
FIG. 1 illustrates a side cross-sectional view of a SOFC stack.

FIG. 1 illustrates a solid oxide fuel cell (SOFC) stack in which each SOFC 1 comprises a cathode electrode 3 (e.g., LSM or other conductive perovskites), a solid oxide electrolyte 5 (e.g., YSZ, ScSZ, or doped ceria), and an anode electrode 7 (e.g., a cermet such as a nickel-stabilized zirconia and/or doped ceria cermet).

Various materials may be used for the cathode electrode 3, electrolyte 5, and anode electrode 7. For example, the anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys.

The ceramic phase may comprise a stabilized zirconia, such as yttria and/or scandia stabilized zirconia and/or a doped ceria, such as gadolinia, yttria and/or samaria doped ceria. The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate 9 separates fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 7 of one cell to the cathode or air electrode 3 of the adjacent cell. In this case, the gas flow separator plate 9, which functions as an interconnect, is made of or contains electrically conductive material. FIG. 1 shows that the lower SOFC 1 is located between two interconnects 9.

Interconnects may be made of or may contain electrically conductive material, such as a metal alloy (e.g., chromium-iron alloy) or an electrically conductive ceramic material, which optionally has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect.

The plurality of fuel cells in a fuel cell stack may share a common fuel inlet and exhaust passages or risers. A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity (e.g., a column of stacks).

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Figure 2:
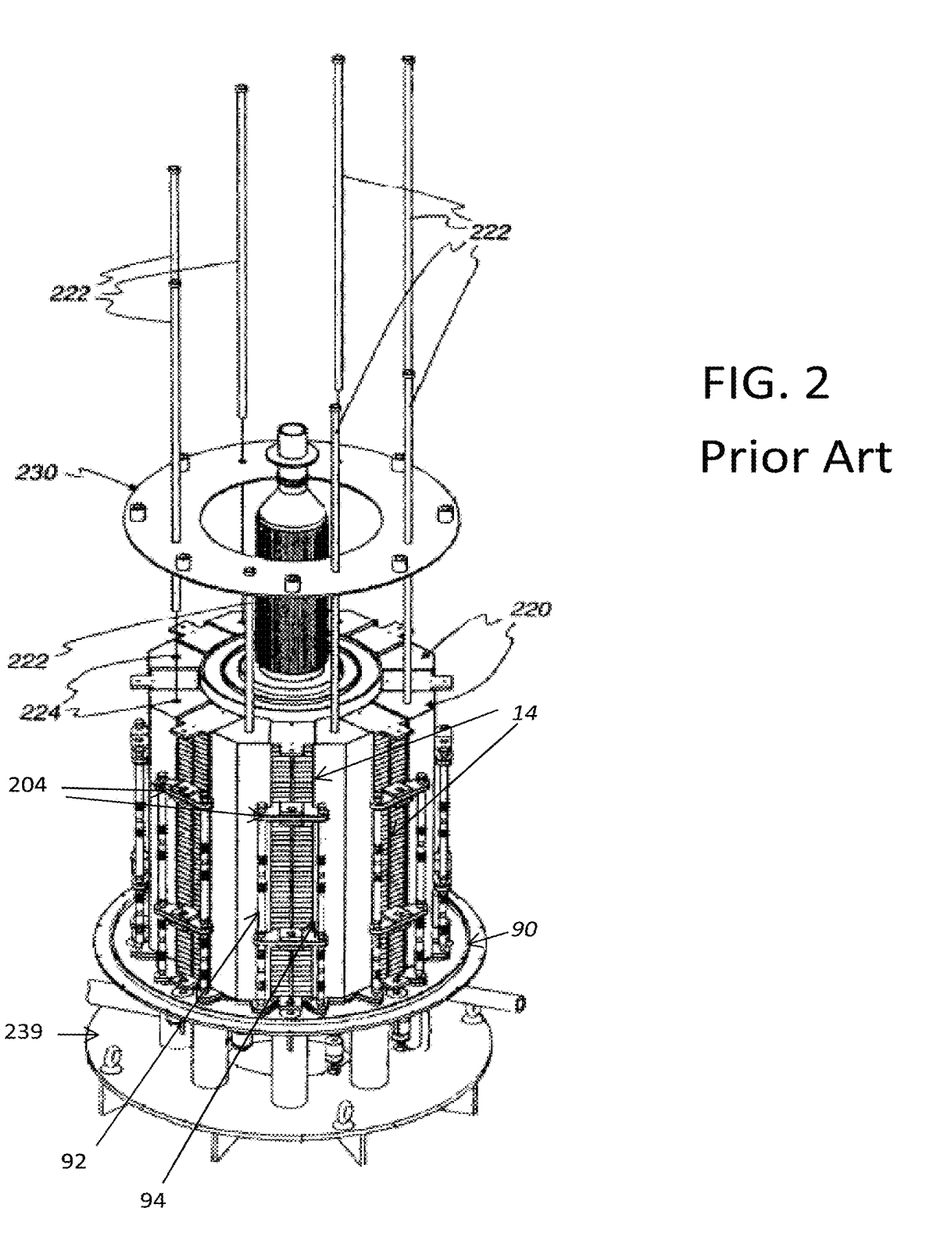
FIG. 2 illustrates a three dimensional cut-away view of a prior art fuel cell assembly.

FIG. 2 illustrates an example of a prior art fuel cell system, such as described in U.S. application Ser. No. 12/458,171 filed on Jul. 2, 2009 and incorporated by reference in its entirety, in which the solid oxide fuel cell (SOFC) stacks 14 are located on a base. Each stack 14 may comprise a collection of fuel cells 1 and interconnects 9. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the externally manifolded cathode feed (e.g., air) into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 2 also shows fuel distribution manifolds 204 between the stacks in the stack column and fuel inlet and exhaust conduits 92, 94 connected to the manifolds. The fuel distribution manifolds 204 comprise a box made of metal plates and fuel delivery space inside the box.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222.

In an alternative embodiment, the load is transmitted through the base 239 as this is the only zero datum of the system. Penetrations or feed-throughs through the base 239 are used in order to pull the required load from the base 239.

Figure 3A:
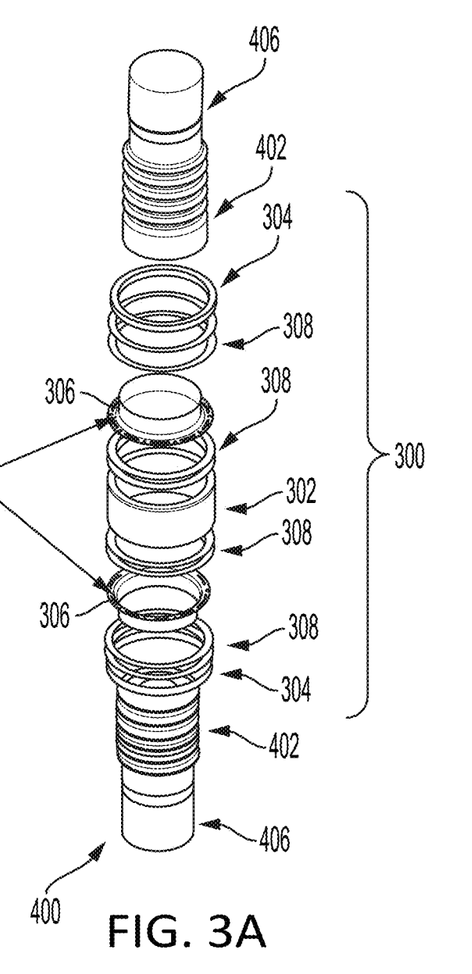
FIG. 3A is an exploded view of an exemplary fuel conduit assembly.
Figure 3B:
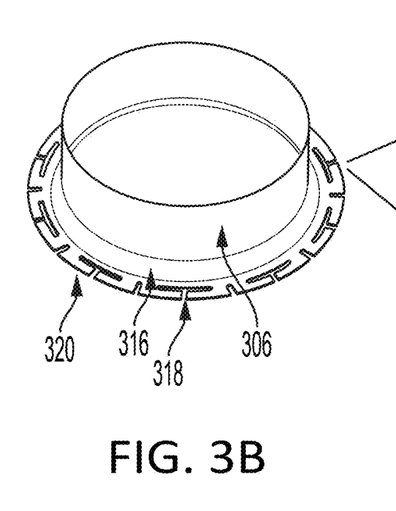
FIG. 3B is a perspective view of a metal tube shown in FIG. 3A, FIGS. 3C-3E are partial perspective views that illustrate different slit patterns that may be included in the metal tube of FIGS. 3A and 3B.

FIG. 3A illustrates an exploded view of an exemplary fuel conduit assembly 400, which may comprise a part of fuel conduits 92, 94. FIG. 3B is a perspective view of a metal tube 306 of FIG. 3A, and FIGS. 3C, 3D, and 3E illustrate different slit patterns that may be included in the metal tube 306.

Referring to FIGS. 3A-3E, the fuel conduit assembly 400 may include a dielectric conduit assembly 300 that is connected to respective fuel conduits 406 by respective bellows 402. The dielectric conduit assembly 300 includes a dielectric tube 302. The dielectric tube 302 may be made from a ceramic material with dielectric properties such that it is electrically insulating under operating conditions (e.g., 600-1200° C.). For example, the dielectric tube 302 may comprise alumina or other ceramic materials possessing high dielectric strength at operating temperatures of the fuel cell system.

In various embodiments, the dielectric tube 302 may comprise high purity alumina, such as greater than 90% alumina (e.g., 94%-99.8% alumina, such as 97%-99.8% alumina). In alternate embodiments, the dielectric tube 302 may comprise silicon nitride, silicon oxynitride, or silicon aluminum oxynitride (SiAlON) based ceramics or zirconia toughened alumina ("ZTA"). The dielectric tube 302 may be coupled with the metal tubes 306 at both ends.

Each metal tube 306 may have a "top hat" shape with a flange or lip 316 on the end coupled with the dielectric tube 302. The flange 316 of each metal tube 306 may include a number of stress relief openings, such as slots 318 (e.g., slots 318A, 318B, 318C), that extend through the thickness of the flange 316 so as to leave stress relief structures 320 (e.g., stress relief structures 320A, 320B, 320C) in the flange 316 surrounding the slots 318 on at least two sides.

Figure 3C:
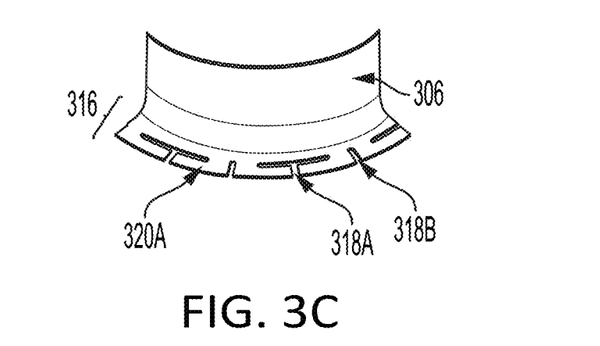
Figure 3D:
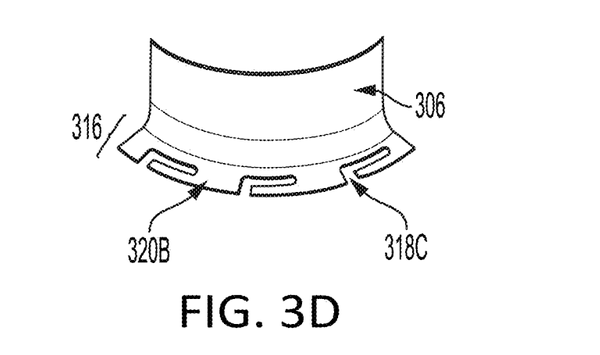
Figure 3E:
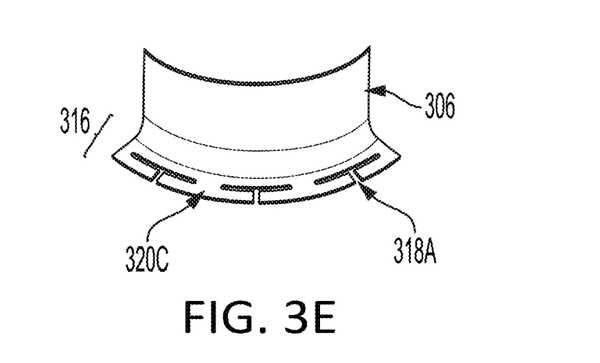

For example, as shown in FIGS. 3B and 3C, the metal tube 302 may include T-shaped slots 318A and linear slots 318B disposed between the T-shaped slots 318A. Accordingly, the flange 316 may include L-shaped stress relief tabs 320A. In other embodiments, as shown in FIG. 3D, the flange 316 may include L-shaped slots 318C that form L-shaped relief tabs 320B. In still other embodiments, as shown in FIG. 3E, the metal tube 302 may include the T-shaped slots 318A without the linear slots 318B, such that the flange 316 includes T-shaped relief tabs 320C. However, the present disclosure is not limited to any particular slot or relief tabs configuration, which are configured to relieve stress imparted to the flange 316 due to bonding of the metal flange 316 to the ceramic tube 302.

In various embodiments, each metal tube 306 may be made of metal alloys that can withstand the operating temperatures of the fuel cell system and have minimal reactivity with gas flowing through the gas delivery device. For example, the metal tubes 306 may comprise stainless steels such as SS 446 (e.g., by weight 23-30% Cr, <1.5% Mn, <0.75% Si, <0.5% Ni, 0.1-0.25% N, <0.12% C, <0.04% P, <0.03% S, balance Fe), 321 stainless (e.g., <0.08% C, 17-19% Cr, 9-12% Ni, <2% Mn, <1% Si, 0.3-0.7% Ti, <0.045% P, <0.03% S, balance Fe), or A286 steels (e.g., 24-27% Ni, 13-16% Cr, 1.9-2.35% Ti, <2% Mn, 1-1.5% Mo, <1% Co, 0.1-0.5% V, <0.35% Al, 0.003-0.01% B, <1% Si, <0.08% C, <0.025% P, <0.025% S, balance Fe), or high temperature alloys, such as Ni—Cr, Ni—Cr—W, Ni—Cr—Mo, Fe—Ni, Ni—Co, Fe—Co, or Fe—Ni—Co alloys. For example, exemplary alloys include Inconel® 600 series alloys, such as 600 (14-17% Cr, 6-10% Fe, 1-1.7% Al, <1% Mn, <0.5% Cu, <0.5% Si, <0.1% C, <0.015 S, balance Ni), 601 (21-25% Cr, 58-63% Ni, <1% Mn, <1% Cu, <0.5% Si, <0.15% C, <0.015 S, balance Fe), 625 (20-23% Cr, <5% Fe, 8-10% Mo, 3.15-4.15 Nb, <0.015 P, <0.4% Al, <0.5% Mn, <0.4% Ti, <0.5% Si, <0.1% C, <0.015 S, balance Ni), or 625 LCF (20-23% Cr, <5% Fe, 8-10% Mo, 3.15-4.15 Nb, <0.015 P, <0.4% Al, <0.5% Mn, <0.4% Ti, <0.15% Si, <0.03% C, <0.015 S, <1% Co, <0.02% N, balance Ni) alloys; or Haynes® 200, 500, or 600 series alloys, such as 230 (e.g., by weight, 22% Cr, 14% W, 0.5% Mn, 2% Mo, <5% Co, 0.1% C, 0.3% Al, <0.015% B, 0.4% Si, 0.02% La, <3% Fe, balance Ni), 556 (e.g., by weight, 22% Cr, 2.5% W, 1% Mn, 3% Mo, 18% Co, 0.1% C, 0.2% Al, 0.6% Ta, 0.4% Si, 0.02% La, 0.02% Zr, 0.2% N, 20% Ni, balance Fe), or 617 (e.g., by weight, 22% Cr, 0.3% Ti, 9% Mo, 12.5% Co, 0.07% C, 1.2% Al, 1% Fe, balance Ni) alloys.

The dielectric assembly 300 may further comprise a dielectric ring 304 coupled with the flange 316 of each metal tube 306. The dielectric rings 304 may comprise a ceramic material similar to the material of the dielectric tube 302. In various embodiments, the dielectric rings 304 and dielectric tube 302 may be matched to have the same or similar coefficient of thermal expansion ("CTE"). For example, the dielectric rings 304 and dielectric tube 302 may comprise the same material. Alternately, the dielectric rings 304 and dielectric tube 302 may comprise different materials, but still have a closely matched coefficient of thermal expansion. In various embodiments, there may be a variability of $10^{-2}$ or less (e.g., a window of $10^{-6}$ to $10^{-8}$) in the CTE values of the dielectric rings 304 and dielectric tube 302.

In alternate embodiments, the dielectric rings 304 and dielectric tube 302 may be deliberately mismatched to have different CTE values. In the dielectric assembly 300, the dielectric rings 304 may hold stress as components expand. More or less stress may be directed to the dielectric rings 304 depending on how the dielectric rings 304, dielectric tube 302, or other components are matched or mismatched.

The dielectric rings 304, dielectric tube 302, and metal tubes 306 may be coupled together by brazing with high temperature braze alloys 308 (e.g., braze rings). Braze alloys 308 may comprise nickel based alloys such as Bni-2 (e.g., 82.4% Ni, 7% Cr, 3% Fe, 3.1% B, 4.5% Si), Bni-4 (e.g., 93.2% Ni, 1.5% Fe, 1.8% B, 3.5% Si), Bni-5 (e.g., 70.9% Ni, 19% Cr, 10.1% Si), Bni-8 (e.g., 65.5% Ni, 23% Mn, 4.5% Cu, 7% Si), and Bni-9 (e.g., 81.4% Ni, 15% Cr, 3.6% B) as specified by AWS.

Figure 4A:
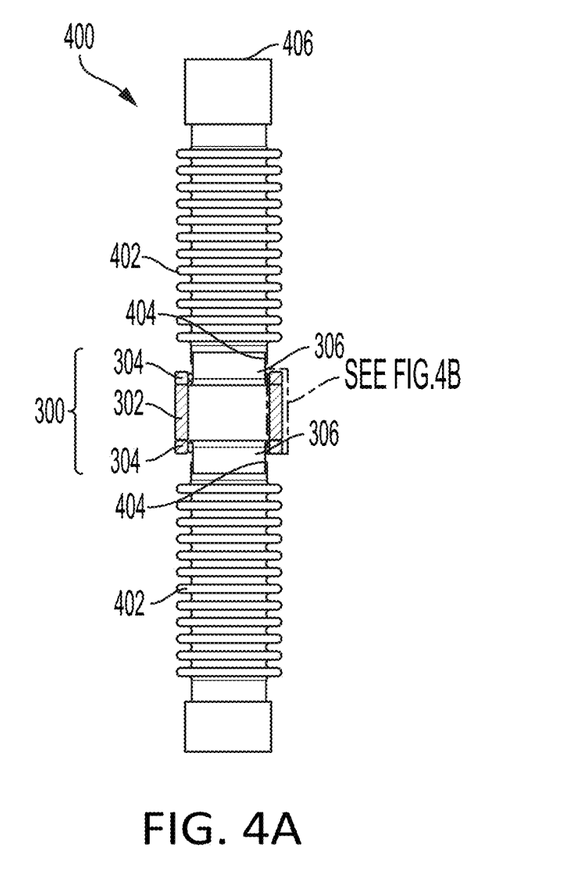
FIG. 4A illustrates an assembled fuel conduit assembly of FIG. 3A.
Figure 4B:
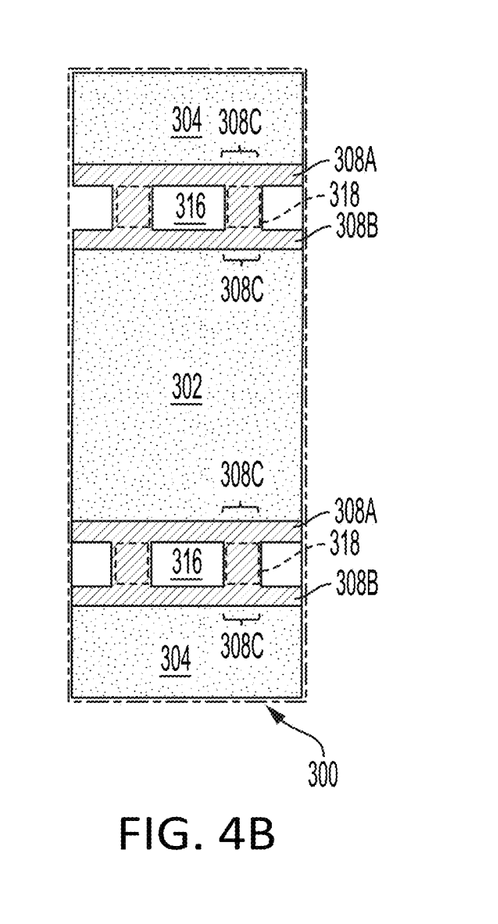
FIG. 4B illustrates a magnified cross-sectional view of a portion of a dielectric assembly of FIG. 4A.

FIG. 4A illustrates the assembled fuel conduit assembly 400, and FIG. 4B illustrates a magnified sectional view of a portion of the dielectric conduit assembly 300 of FIG. 4A. Referring to FIGS. 4A and 4B, the flange 316 of each metal tube 306 may be coupled with respective opposite ends of the dielectric tube 302, such as with a braze alloy 308 (not shown). Each dielectric ring 304 may go around one of the metal tubes 306. Each dielectric ring 304 may be coupled with the flange 316 of the metal tube 306 such that one side of each flange 316 is coupled with the dielectric tube 302 and the other side of each flange 316 is coupled with a dielectric ring 304. Each dielectric ring 304 may go over metal tube 306 and contact a back side of the flange 316 such that the flange 316 separates the dielectric rings 304 and the dielectric tube 302 and prevents the rings 304 and tube 302 from contacting one another. In alternate embodiments, the dielectric rings 304 may be inside the metal tubes 306 rather than outside the metal tubes 306, such as if the flange 316 extended inward from the circumference of the metal tube 306 as shown, for example, in FIG. 5A.

In various embodiments, the metal tubes 306 may be coupled with other fuel cell system parts, such as by using metallic joints formed by brazing, welding, or mechanical seals. For example, the metal tubes 306 may be coupled with gas delivery plumbing, such as fuel conduits 406 or bellows 402, a fuel cell stack or column (such as fuel inlets of one or more fuel manifold plates 204 of the stack), and/or a fuel cell hot box. Various embodiment assemblies may be part of the fuel inlet and exhaust conduits 92, 94 connected to the fuel distribution manifolds 204 between the fuel cell stacks 14 (see FIG. 2 for location). Thus, the fuel cell conduit assembly 400 is fluidly connected to the fuel distribution manifold 204. As used herein, fluidly connected means connected such that a fluid, such as a fuel inlet or outlet stream (e.g., a gas stream) can flow directly or indirectly between the fuel cell conduit assembly 400 and the fuel distribution manifold 204.

During a brazing process, the braze alloys 308 (see FIGS. 3A and 4B) may form a first brazed joint 308A or layer between a first surface of the flange 316 of each metal tube 306 and the corresponding dielectric ring 304, and form a second brazed joint 308B or layer between an opposing second surface of the flange 316 and the corresponding dielectric tube 302. In addition, the braze alloys 308 may also flow into the slots 318, to form ceramic-to-ceramic bonding points 308C between each dielectric tube 302 and the corresponding dielectric rings 304. In other words, the slots 318 allow the braze alloys 308 to connect the first and second brazed joints 308A, 308B to form a single joint structure. In addition, the slots 318 and bonding points 308C may also allow for the overall thickness of the first and/or second brazed joints 308A, 308B to be reduced.

In conventional dielectric assemblies that do not include a slotted metal tube 306, brazing produces brazed joints that provide only metal-to-ceramic bonding. While not wishing to be bound to a particular theory, it is believed that braze alloys generally exhibit stronger bonding to one of a metal or a ceramic material. In other words, braze alloys configured to bond ceramic materials generally form stronger bonds to ceramic materials than to metals.

Differences in the material properties of the metal and ceramic components of the dielectric assembly 300, such as CTE mismatch between the metal tube 306 and the dielectric tube 302 and ring 304, generate interface stress during thermal processes, such as during brazing and/or thermal cycling. Over time, such stress may lead to weakening of a conventional braze joint, especially at braze alloy to metal interfaces. As a result, the lifespan of conventional dielectric assemblies may be significantly reduced by thermal stress.

In contrast, the slots 318 of the present dielectric assembly 300 allow the braze alloys 308 to form ceramic-to-ceramic bonding points 308C, where the braze alloy 308 is bonded with both the dielectric tube 302 and the ring 304 with the same strength. Further, the slots 318 may operate as relief cuts to reduce stress applied to the flange 316 due to thermal expansion and/or contraction. In particular, the slots 318 also allow for the reduction of stress and strain applied at interfaces between the flange 316 and the surfaces of the adjacent ceramic components 302, 304. For example, the slots 318 may allow for interface stresses of less than about 200 MPa, such as less that about 190 MPa, or less than about 180 MPa, such as from about 170 MPa to about 190 MPa, after multiple thermal cycles.

Accordingly, the slots 318 may reduce brazing joint thickness and provide for the formation of ceramic-to-ceramic bonding points, and may thereby increase the lifespan of a dielectric assembly, as compared to conventional assemblies that do not include such slots.

The metal tubes 306 are coupled to bellows 402 with a joint 404 such as a brazed or welded joint. The bellows 402 may be connected to fuel conduits 406. The bellows 402 may act to compensate for differences in coefficients of thermal expansion between fuel cell components. For example, the bellows 402 may acts to minimize stresses exerted upon the fuel cell stack or column components, such as fuel manifold plates, such as the plates described in U.S. Pat. No. 7,713,649, issued on May 11, 2010, which is incorporated by reference in its entirety.

In various embodiments, the bellows 402 may minimize stresses exerted upon the fuel cell stack or column by deforming in the axial and/or radial directions in preference to other components of the fuel conduits 406 and other fuel cell components. In this way, the bellows 402 may absorb stress rather than transmit stress to other components, such as ceramic components which can crack and break under excessive stress. In various embodiments, the metal tubes 306 and the bellows 402 may be matched to have the same or similar CTE. For example, the metal tubes 306 and the bellows 402 may comprise the same material or different materials that are closely matched coefficient of thermal expansion.

Figure 5A:
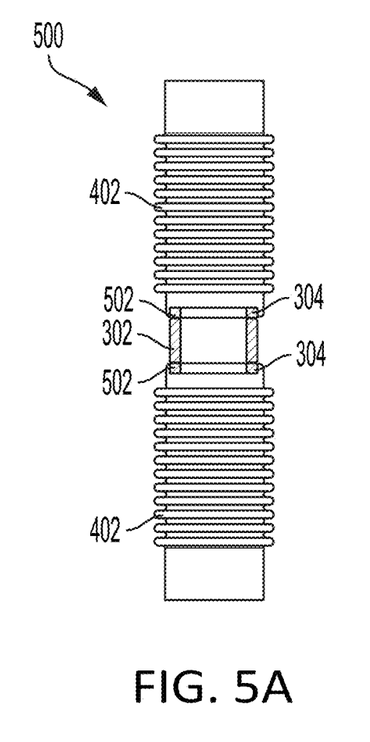
FIG. 5A is a side cross-sectional view of an exemplary fuel conduit assembly in which the metal tubes are metal bellows.
Figure 5B:
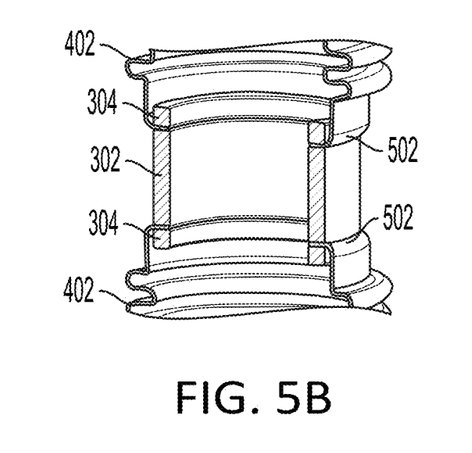
FIG. 5B is a close up of the assembly.

In alternate embodiments, the metal tubes 306 may include or be made entirely of bellows themselves rather than coupled with bellows 402, such that the bellows 402 may be directly coupled with the dielectric tube 302. As illustrated in FIGS. 5A and 5B, an embodiment assembly 500 may include bellows 402 with a flange 502 that extends inward from the circumference of the bellows 402. One side of the flange 502 may be coupled with the dielectric tube 302, such as by brazing or welding. Dielectric rings 304 may be coupled with the other side of the flange 502, such as with the dielectric rings 304 located inside of the hollow inner space in the bellows 402 as shown in FIG. 5A.

Figure 5C:
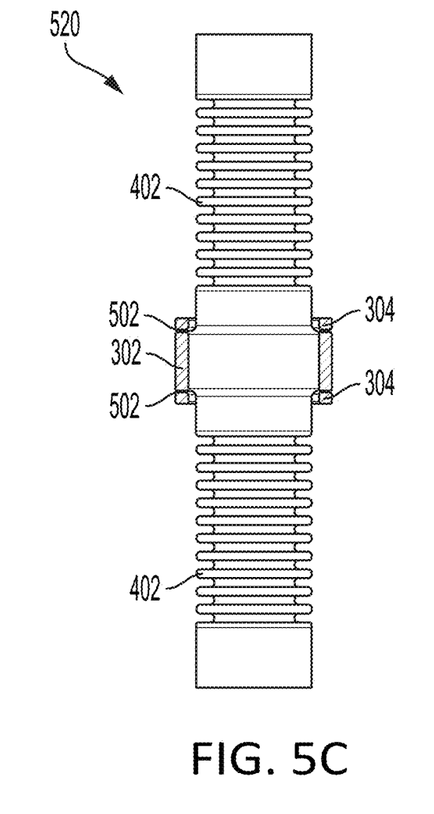
FIG. 5C is a side cross-sectional view of an alternate embodiment fuel conduit assembly in which the metal tubes are metal bellows.
Figure 5D:
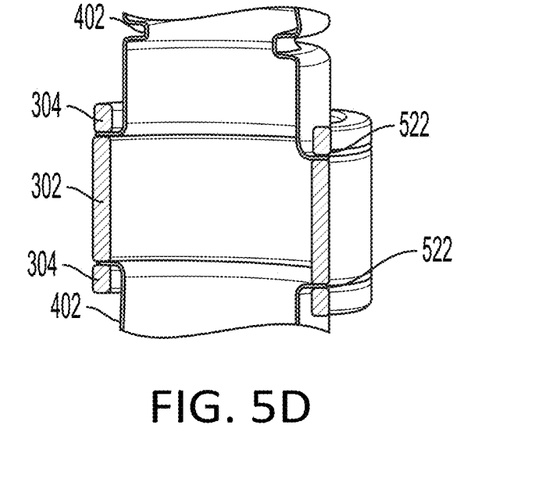
FIG. 5D is a close up of the assembly.

In alternate embodiments, the bellows 402 may have a flange 522 extending outward. FIGS. 5C and 5D illustrate an embodiment assembly 520 with bellows 402 having a flange 522 extending outward. The flange 520 of the bellows 402 may be coupled, such as by brazing or welding, to the dielectric tube 302 and the dielectric rings 304, such as with the dielectric rings 304 located outside of the bellow 402 (i.e., surrounding the bellow's outer circumference) similar to the assembly with metal tubes 306 in FIG. 3B.

According to various embodiments of the present disclosure, the flanges 502, 522 may include relief slots 318 as described above with respect to FIGS. 3C-3D. The flanges 502, 522 may be brazed to the dielectric tube 302 and the dielectric rings 304 by brazing, such that ceramic-to-ceramic bonding points are formed through the relief slots, between the dielectric tube 302 and the dielectric rings 304. Although the previous embodiments have illustrated symmetric assemblies with similar structures on both ends of the dielectric tube 302, further embodiment assemblies may connect different structures, such as different components or similar components oriented different ways.

Figure 6:
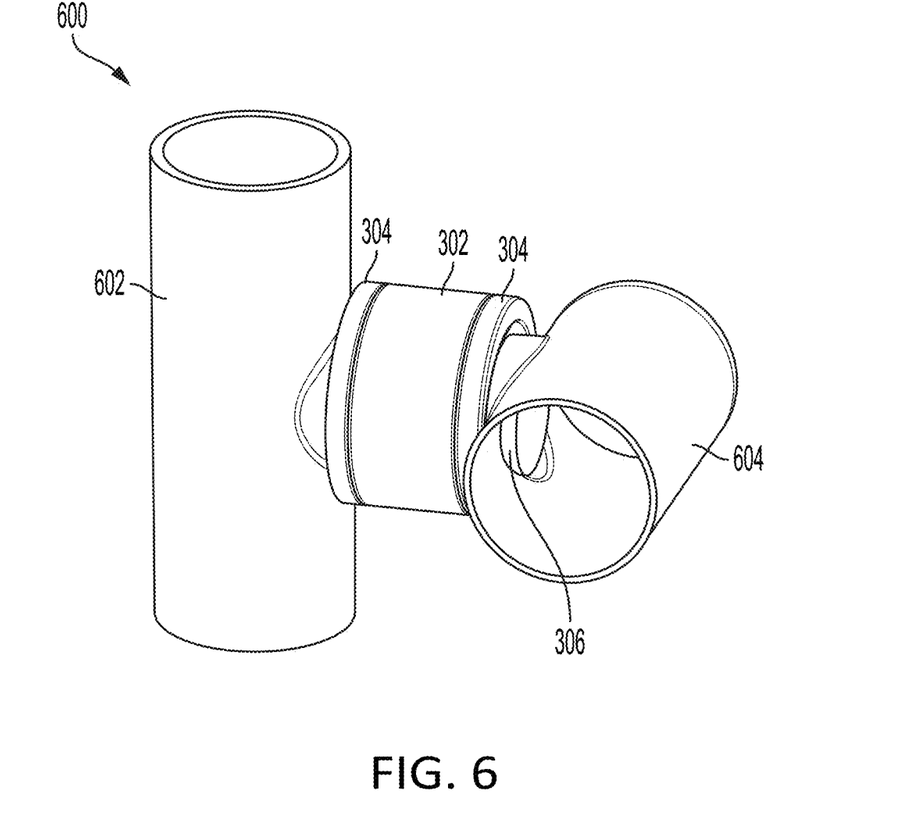
FIG. 6 illustrates an embodiment fuel conduit assembly in which the metal tubes are coupled with pipe tees.

For example, as illustrated in FIG. 6, an embodiment assembly 600 may include a first pipe tee 602 connected to one metal tube 306 and a second pipe tee 604 connected to the other metal tube 306. The first pipe tee 602 and second pipe tee 604 may be oriented in different directions. For example, the first pipe tee 602 may deliver fuel in (or fuel out) from the fuel conduits 92, 94 and the second pipe tee 604 may deliver fuel in (or fuel out) to a manifold plate in the fuel cell stack.

In alternate embodiments, pipe tees or other components may be directly coupled with the dielectric tube 302 and dielectric rings 304 similar to how the bellows were coupled with the dielectric tube 302 and dielectric rings 304 in FIGS. 5A and 5C.

Figure 7:
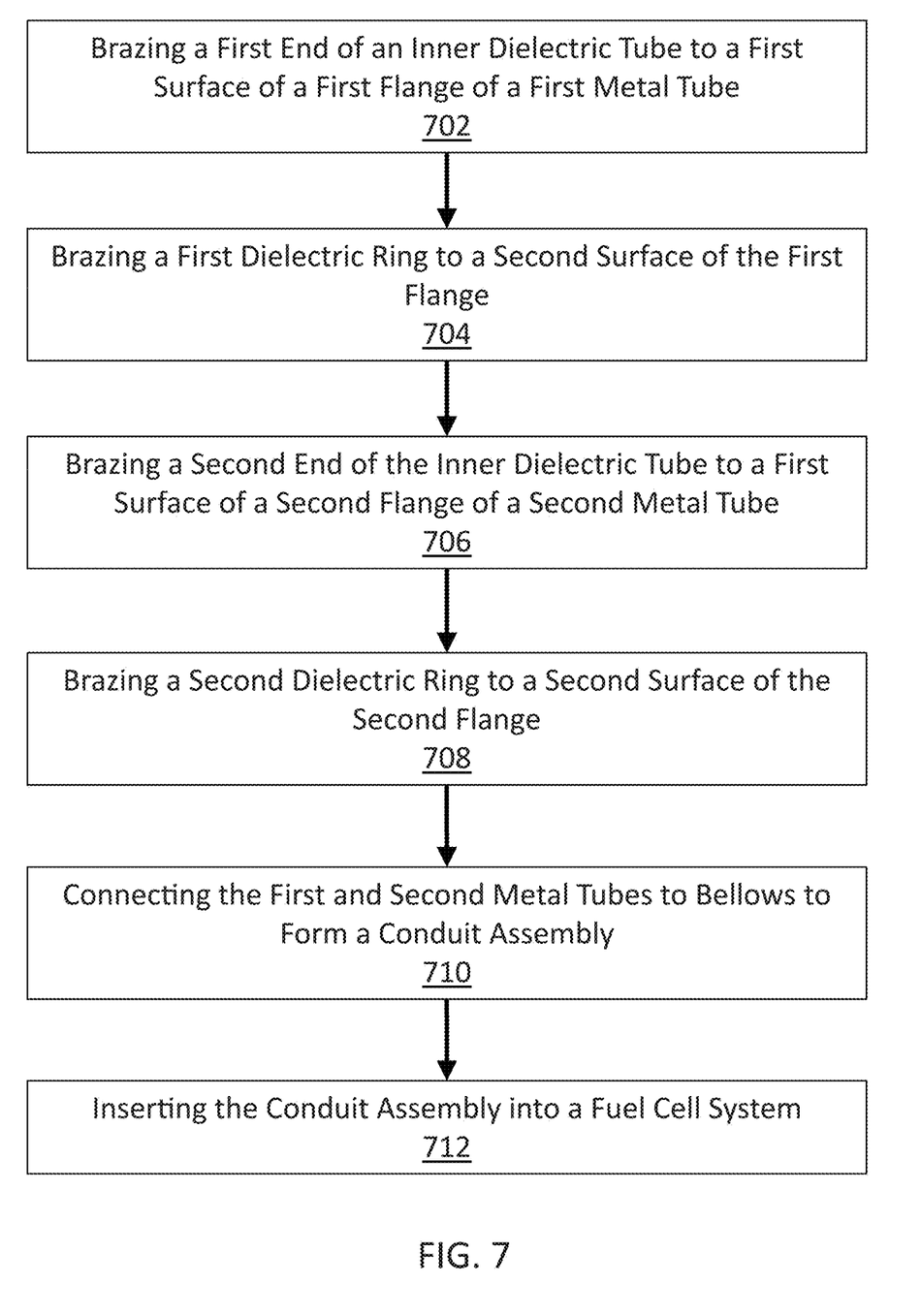
FIG. 7 is a flow chart illustrating an embodiment of a disclosed method.

FIG. 7 illustrates an exemplary method of making a fuel cell system conduit assembly as described above with respect to FIGS. 3A-3E. In step 702, the method may include brazing a first end of a dielectric tube to a first surface of a first flange of a first metal tube. In step 704, the method may include brazing a first dielectric ring to a second surface of the first flange, such that a direct braze bond between the dielectric tube and the first dielectric ring through openings in the first flange.

In step 706, the method may include brazing or welding a second end of the inner dielectric tube to a first surface of a second flange of a second metal tube. In step 708, the method may further include brazing a second dielectric ring to a second surface of the second flange, such that a direct braze bond between the dielectric tube and the second dielectric ring through openings in the second flange. In step 710, the method may further involve connecting the first and second metal tubes to first and second bellows to form a conduit assembly.

In step 712, the method may additionally include inserting the conduit assembly into the fuel cell system. Inserting the conduit assembly into the fuel cell system may involve attaching the conduit assembly to a fuel manifold of a fuel cell stack. In some embodiments, the dielectric tube, and the first and the second dielectric rings may each include a ceramic material.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A conduit assembly, comprising:
a dielectric tube having a first end and a second end;
a first metal tube comprising a first flange coupled to the first end of the dielectric tube, the first flange comprising relief openings;
a first dielectric ring coupled to the first flange;
a second metal tube comprising a second flange coupled to the second end of the dielectric tube, the second flange comprising relief openings;
a second dielectric ring coupled to the second flange;
wherein:
the relief openings in the first flange and the second flange comprise discontinuous slot segments that extend circumferentially through each flange;
the first flange and the second flange further comprise tab segments; and
each tab segment has a first portion adjacent to a respective one of the discontinuous slot segments and an opposing second portion substantially coextensive with circumferential edge of the flange.

2. The conduit assembly of claim 1, wherein the discontinuous slot segments comprise L-shaped relief slots or T-shaped relief slots, or a combination thereof.

3. The conduit assembly of claim 1, further comprising:
a first brazed joint disposed between the first flange and the first dielectric ring; and
a second brazed joint disposed between the first flange and the first end of the dielectric tube,
wherein the first and second brazed joints are connected at brazed bonding points that extend through the relief openings of the first flange.

4. The conduit assembly of claim 3, further comprising:
a third brazed joint disposed between the second flange and the second dielectric ring; and
a fourth brazed joint disposed between the second flange and the second end of the dielectric tube,
wherein the first and second brazed joints are connected at brazed bonding points that extend through the relief openings of the second flange.

5. The conduit assembly of claim 4, wherein the dielectric tube, the first dielectric ring, and the second dielectric ring each comprise a ceramic material.

6. The conduit assembly of claim 5, wherein the ceramic material comprises, alumina, zirconia toughened alumina, or silicon nitride.

7. The conduit assembly of claim 4, wherein the first, second, third and fourth brazed joints comprise a nickel-based braze alloy.

8. The conduit assembly of claim 1, wherein the conduit assembly is incorporated into a fuel conduit which is fluidly connected to one or more fuel cell stacks.

9. The conduit assembly of claim 1, wherein the first and second metal tubes comprise stainless steel or a nickel chromium alloy.

10. The conduit assembly of claim 1, further comprising first and second bellows respectively connected to the first and second metal tubes.

11. The conduit assembly of claim 1, wherein:
the first flange extends outward from a circumference of the first metal tube; and
the second flange extends outward from a circumference of the second metal tube.

12. The conduit assembly of claim 1, wherein:
the first flange extends inward from a circumference of the first metal tube; and
the second flange extends inward from a circumference of the second metal tube.

13. The conduit assembly of claim 1, wherein the discontinuous slot segments comprise-L-shaped relief slots or T-shaped relief slots, or a combination thereof.

14. The conduit assembly of claim 1, wherein the first flange, the second flange, or both the first flange and the second flange further comprise linear relief slots extending from a circumferential edge of the flange.

15. A conduit assembly, comprising:
a dielectric tube having a first end and a second end;
a first metal tube comprising a first flange coupled to the first end of the dielectric tube, the first flange comprising relief openings;
a first dielectric ring coupled to the first flange;
a second metal tube comprising a second flange coupled to the second end of the dielectric tube, the second flange comprising relief openings; and
a second dielectric ring coupled to the second flange;
wherein the relief openings comprise relief slots configured to relieve stress applied to the first and second flanges; and wherein the relief slots divide the first and second flanges into having relief tabs.

16. The conduit assembly of claim 15, wherein the relief tabs are L-shaped, T-shaped, or a combination thereof.

17. A conduit assembly comprising:
a first dielectric ring;
a first metal tube, the first metal tube comprising a first flange portion;
a dielectric tube, the dielectric tube having a first end and a second end;
a second metal tube, the second metal tube comprising a second flange portion;
a second dielectric ring;
the first dielectric ring is brazed to the first metal tube at a first brazing joint with a first brazed alloy;
the first end of the dielectric tube is brazed to the first metal tube at a second brazing joint with a second brazed alloy;
the second dielectric ring is brazed to the second metal tube at a third brazing joint with a third brazed alloy;
the second end of the dielectric tube is brazed to the second metal tube at a fourth brazing joint with a fourth brazed alloy;
the first flange portion contains discontinuous slot segments that extend circumferentially through the first flange portion;
the first brazed alloy and the second brazed alloy bond the first dielectric ring to the first end of the dielectric tube by connecting the first brazed alloy to the second brazed alloy through the discontinuous slot segments in the first flange portion;
the second flange portion contains discontinuous slot segments that extend circumferentially through the second flange portion; and
the third brazed alloy and the fourth brazed alloy bond the second dielectric ring to the second end of the dielectric tube by connecting the third brazed alloy to the fourth brazed alloy through the discontinuous slot segments in the second flange portion.

18. The conduit assembly of claim 17, wherein the first brazed alloy, the second brazed alloy, the third brazed alloy and the fourth brazed alloy comprise nickel brazed alloys.

19. The conduit assembly of claim 17, wherein the first dielectric ring, the second dielectric ring, and the dielectric tube comprise ceramic materials selected from the group consisting of alumina, silicon nitride, silicon oxynitride, silicon aluminum oxynitride or zirconia toughened alumina.

20. A fuel cell system, comprising:
a fuel cell stack comprising a fuel manifold; and
a fuel cell conduit assembly of claim 1 fluidly connected to the fuel manifold.

* * * * *